Figure 4:
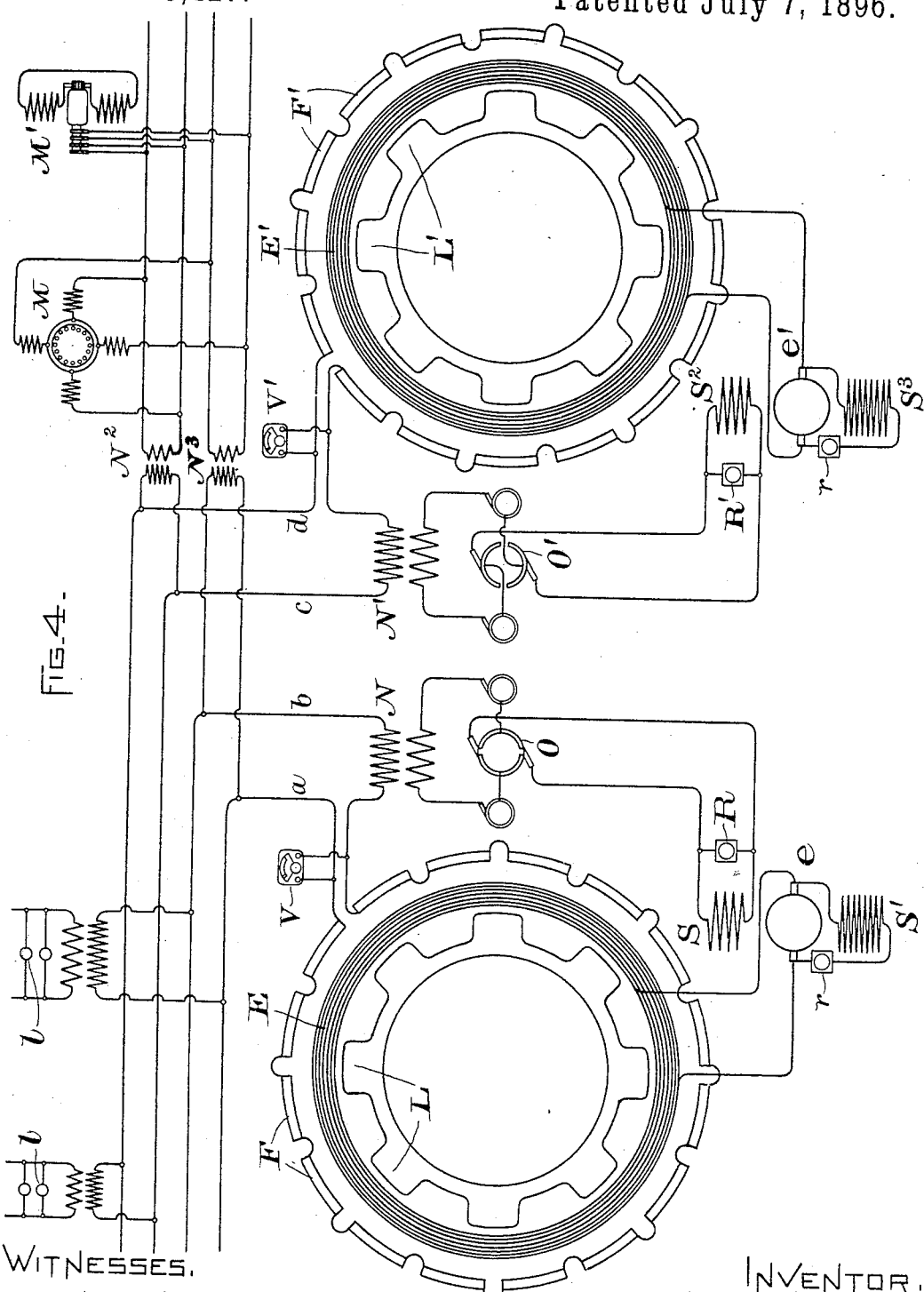

(No Model.) 2 Sheets—Sheet 1.
C. P. STEINMETZ.
COMPOUND WOUND MULTIPHASE GENERATOR.
No. 563,427. Patented July 7, 1896.
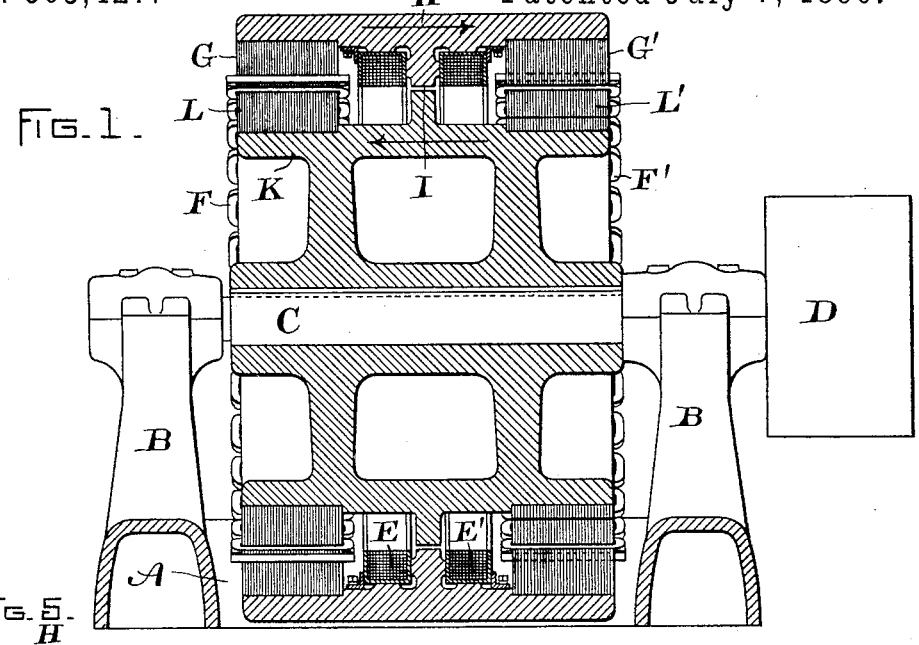
Fig. 1.
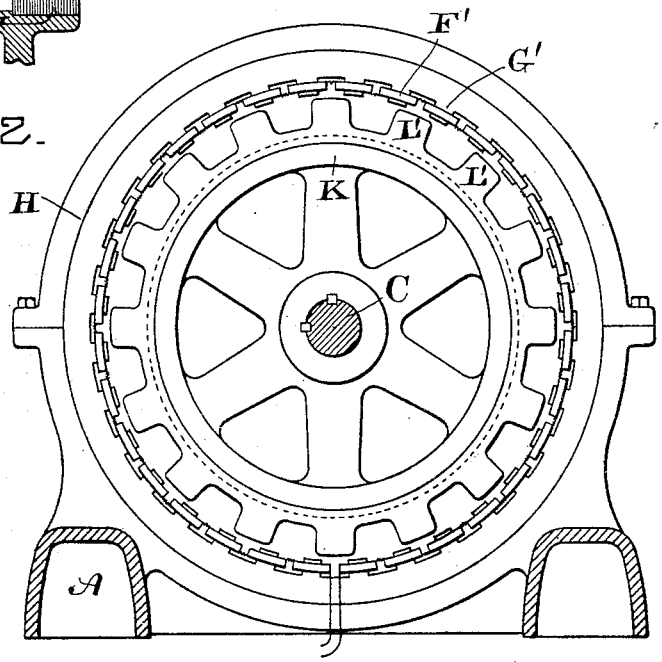
Fig. 5.
Fig. 2.
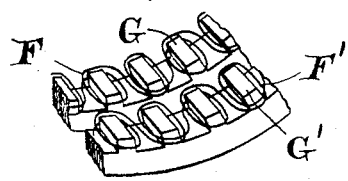
Fig. 3.
WITNESSES.
A. H. Abell.
A. F. Macdonald.
INVENTOR.
Charles P. Steinmetz
Geo. R. Blodgett.
Atty.

(No Model.) 2 Sheets—Sheet 2.

C. P. STEINMETZ.
COMPOUND WOUND MULTIPHASE GENERATOR.

No. 563,427. Patented July 7, 1896.

WITNESSES.
A. H. Abell.
A. F. Macdonald.

INVENTOR.
Charles P. Steinmetz,
Geo. R. Blodgett,
atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

COMPOUND-WOUND MULTIPHASE GENERATOR.

SPECIFICATION forming part of Letters Patent No. 563,427, dated July 7, 1896.

Application filed March 19, 1896. Serial No. 583,878. (No model.)

*To all whom it may concern:*

Be it known that I, CHARLES P. STEINMETZ, a subject of the Emperor of Germany, residing at Schenectady, in the county of Schenectady, State of New York, have invented certain new and useful Improvements in Dynamo-Electric Machines and Methods of Compounding the Same, (Case No. 331,) of which the following is a specification.

My invention relates to dynamo-electric machines, particularly to those of the polyphase type of alternating apparatus, and also to novel ways of compounding such apparatus. It is in part applicable also to other dynamo-electric machines, particularly to those of the single-phase type, but finds its greatest usefulness in polyphase apparatus.

The main objection to the use of the polyphase systems now well known in the art lies in the fact that the load must be distributed with substantial equality upon the different branches of the system, in order to avoid "unbalancing," as it is called; that is, having different voltages in the different phases or branches. In the ordinary construction of machines, however, since all the phases issue from the same magnetic field, and thus have the same induced electromotive force, at unequal loads there would be different drops, and hence different terminal voltages in the different phases. To overcome this difficulty, it is desirable to compound the different phases independently, or otherwise independently regulate them to compensate for the different terminal electromotive forces. This it is possible to accomplish by coupling two single-phase machines rigidly in quadrature for polyphase apparatus, and in this case the phases may be compounded independently, and the voltages regulated in any desired manner, and this whether the load be distributed equally or not. I have found that the most convenient way in which this may be accomplished is in an inductor-dynamo of novel construction which I have devised, and the particular type of which forms a part of the present invention. In it I provide two separate armatures, each armature having its own field, and these armatures are, as in other machines of this class, stationary, the magnetization being furnished by a field-coil, also stationary; an inductor with suitable salient poles or projections being provided, which sets up by its revolution the alternations in magnetic fluxes necessary for the generation of current. The two sets of armature-coils are arranged for a two-phase machine in quadrature; and the two field-coils (which are independent, or substantially independent, as will be more fully described hereinafter) are provided with separate excitation and independent regulation by which the phases may have their terminal electromotive forces adjusted in any desired way to compensate for inequalities of load. Between the two fields I provide a magnetic shunt, the particular utility and functions of which will presently be more fully pointed out.

The machine thus described differs from the ordinary inductor-dynamos in which two sets of armature-coils are provided with a revolving inductor and a single field-coil, inasmuch as in this well-known arrangement the two phases, being induced in the same field, have similar terminal electromotive forces, and hence differences of load will unbalance them and reduce the efficiency of the system. As the armature-coils are traversed by the same flux, it will not be possible to regulate for the independent control of the phases.

Another form of dynamo which has been proposed is composed of two independent inductor-machines embodied in a single structure and provided with a return-circuit for the lines of force, which passes between the two field-magnet coils, the two magnetic circuits being energized in opposite senses, so that this return-circuit carries all of the lines of force in the two circuits, passing in the same direction. This form of machine is, however, extremely heavy for its output, and while the different phases, if the two armatures be coupled to produce different phases, could be compounded independently, there is a reaction of one phase upon the other, which is objectionable, inasmuch as an increase of load in one side, and a consequent stronger magnetization, backs down the lines of force in the other magnetic circuit and reduces the terminal voltage. The machine of my invention, however, differs from both of these forms in that, instead of magnetizing the two circuits in opposite senses, the yoke of the field-magnet and armature-cores and the inductor form a single magnetic circuit. Between the field-magnet coils, which are so wound as to energize this circuit in the same sense, I provide a magnetic shunt which may be of small size, and this shunt forms a path for the lines of force in one circuit which are in excess of those in the other. Thus by my invention, where the phases are separately compounded, upon increase of load and current in one side of the machine, there is but little reaction upon the other side, and such magnetic action as does exist tends, as will hereinafter be pointed out, to assist the weaker side of the machine, rather than to cut down its electromotive force.

While I have described the invention as embodied in an inductor-dynamo, it is manifest that in one aspect of it it might be embraced in machines which have ordinary wound armatures revolving before field-poles of ordinary type, where such machines embrace separate fields substantially independent of one another having separate means of excitation and independent regulating arrangements whereby their compounding or variation under change of load is accomplished. I believe, however, that the particular type of machine which I have illustrated and described herein has advantages over other constructions.

The accompanying drawings show my invention, Figures 1 and 2 being, respectively, a section and side elevation of an inductor-dynamo embodying my invention. Fig. 3 is a detail of the arrangement of the armature-coils in diagrammatic perspective. Fig. 4 shows a diagram of the various circuits. Fig. 5 is a detail showing the magnetic circuits of the machine of my invention.

Referring now to Figs. 1, 2, and 3, the arrangement of the preferred form of machine is illustrated. A is the base, B B are the pillars for the bearings, C is the shaft, and D is the pulley, of the machine. A ring-shaped field-magnet H is also provided, energized by the field-magnet coils E E'. Upon opposite sides of the ring or cylinder are the armature-coils F F', mounted upon laminated projections G'. The two armatures are arranged in quadrature, the arrangement being best shown in Fig. 3, wherein the coils are for the sake of clearness illustrated with a single line. The revolving inductor K is provided with laminated projections L L', which serve, as in such machines is common, to vary the magnetic flux passing through the coils F F' of the two armatures. At I, between the coils E E', is the magnetic shunt to which reference is made. It is to be understood that the two coils are wound in the same direction, so that the fluxes in the magnetic circuit (indicated by the arrows) will be in the same direction.

Referring now to Fig. 4, I illustrate the circuits of the machine, together with the means for compounding the two circuits, and for regulating not only the output, but the change of voltage under change of load, or ratio of compounding. E E' are, as before, the field-magnet coils, giving the two field-fluxes for the armatures. F F' are the armature-coils, those of one armature being in quadrature to those upon the other. The field-magnet coils E E' are respectively supplied with current from the exciters $e\ e'$, which are machines of the ordinary type, provided with regulating-resistances $r\ r'$ in the circuits of their shunt-coils $S'\ S^3$. The machines are also furnished with compounding-coils S S' and rectifying-commutators O O', supplied from the transformers N N', having their secondaries connected to the rectifiers by collecting-rings. These commutators are shown as having but two segments; but this is diagrammatic only, as they would of course be provided with a sufficient number to commute the current properly, the usual arrangement being one segment for each armature-coil. This, however, is well understood by those skilled in the art. Resistances R R' are respectively coupled across the series coils for the purpose of changing the ratio of compounding. The transformers N N' are of the series type, their primaries being respectively connected in the circuit of the mains $a\ b$ and $c\ d$. Lamps $l\ l$ are connected in each of the two circuits, while motors M M', representing diagrammatically induction and synchronous motors of the two-phase type, are connected by means of the transformers $N^2\ N^3$ to all of the mains, being thus supplied with current of two phases either through independent or interlinked windings upon the motors. At V V', I indicate voltmeters, by the readings of which the regulating-resistances would be adjusted.

In the machine as illustrated in Figs. 1 and 5 the two armatures are excited by the magnetizing-coils in such a way that both the inductor-core and the armature-yoke are magnetized in a single circuit. The gap or magnetic shunt I is therefore of small size, inasmuch as it does not carry the entire magnetic flux, but only that due to the difference between the two sides of the machine. Obviously at equal voltage and equal load on the two sides of the machine no lines of force would pass across the gap, since it lies between two magnetic equipotential points. If, however, the load on one side be increased and the field-excitation be correspondingly increased, so that the magnetic flux in one armature increases beyond that in the other, the difference between the two passes through the gap and does not affect materially the second armature. The independent compounding or regulation of the two sides of the machine is thus effectively provided for, as the two sides are independent, while whatever tendency to reaction exists between them is in a direction to assist the side having the lower voltage, instead of decreasing its terminal electromotive force. This reaction is, however, quite small, as it is only that due to a small portion of the difference between the two sides, the larger portion of this difference passing through the shunt.

What I claim as new, and desire to secure by Letters Patent of the United States, is—

1. In combination, two separate armatures connected in quadrature and energized by different fields, independent circuits extending from each armature, and independent compounding and regulating means in each of the circuits.

2. A dynamo comprising armatures disposed in inductive relation to separate fields energized in the same sense so as to constitute a single magnetic circuit, a magnetic shunt between the fields through which passes the excess of lines of force in one field over those in the other, and a revolving inductor; in combination with a line-circuit extending from each armature, and independent means for regulating each circuit.

3. A dynamo-electric machine comprising armatures disposed in inductive relation to separate fields energized in the same direction so as to constitute a single magnetic circuit for both armatures, and a magnetic shunt between the fields.

4. An inductor-dynamo comprising armatures having separate field-coils energizing in the same sense a single magnetic circuit for the armature, a magnetic shunt between the fields, and a revolving inductor.

5. An inductor-dynamo of the two-phase type, comprising two separate armatures having their coils arranged in quadrature, field-coils energizing in the same sense a single magnetic circuit for both armatures, a magnetic shunt between the fields, and a revolving inductor.

6. In a polyphase alternator, a magnetic shunt permitting independent control of the fields.

In witness whereof I have hereunto set my hand this 16th day of March, 1896.

CHARLES P. STEINMETZ.

Witnesses:
B. B. HULL,
A. F. MACDONALD.